United States Patent
Colasanti et al.

[11] 3,957,223
[45] May 18, 1976

[54] LIMITER FOR VEHICLE SAFETY BELT TENSION-RELIEVING APPARATUS

[75] Inventors: Arduino Colasanti, East Detroit; Lawrence Robert Kiehart, Mount Clemens; Dornis L. Levasseur, Warren, all of Mich.

[73] Assignee: Allied Chemical Corporation, New York, N.Y.

[22] Filed: May 12, 1975

[21] Appl. No.: 576,825

[52] U.S. Cl. .................. 242/107.6; 242/107.4 R
[51] Int. Cl.² .................. A62B 35/00; B65H 75/48
[58] Field of Search ....... 242/107.6, 107.7, 107.4 R, 242/107.4 E; 280/150 SB; 297/388

[56] References Cited
UNITED STATES PATENTS

| | | | |
|---|---|---|---|
| 3,700,184 | 10/1972 | Francis | 242/107.6 X |
| 3,834,646 | 9/1974 | Heath | 242/107.7 |

Primary Examiner—Stanley N. Gilreath
Assistant Examiner—John M. Jillions
Attorney, Agent, or Firm—John P. Kirby, Jr.

[57] ABSTRACT

A limiting device limits the amount of withdrawal of a shoulder belt from a safety belt retractor when a tension-relieving apparatus for the shoulder belt is in operation. The shoulder belt tension-relieving apparatus includes: a tension-relieving locking member, a tension-relieving wheel, and an actuating means for the locking member. The limiting device includes a cam and a stop means. The cam is mounted adjacent to the tension-relieving wheel for rotation therewith. The stop means is mounted on the retractor to limit rotation of the cam and a reel shaft in a direction corresponding to withdrawal of the safety belt from the retractor. As a result, the stop means limits the amount of shoulder belt which can be unwound from the retractor when the tension-relieving apparatus is in operation.

6 Claims, 4 Drawing Figures

LIMITER FOR VEHICLE SAFETY BELT TENSION-RELIEVING APPARATUS

BACKGROUND OF THE INVENTION

The invention relates to a vehicle safety belt system and, more particularly, to an improvement for a tension-relieving apparatus in a vehicle safety belt retractor. The improvement is a device which limits the amount of withdrawal of a shoulder belt from the retractor when a tension-relieving apparatus for the shoulder belt is in operation.

Safety belt retractors for use in vehicles typically include a rewind mechanism which operates to wind the shoulder belt into the retractor. The rewind mechanism exerts tension on the shoulder belt which has proven to be annoying to the user of the shoulder belt. Prior art tension-relieving apparatus have been proposed which relieve such tension on the shoulder belt. Such prior art tension-relieving apparatus typically prevent the rewind mechanism of the retractor from winding the shoulder belt into the retractor. As a result of such interference with the operation of the rewind mechanism, there is an undesirable side effect that an excess length of the shoulder belt can be unwound from the retractor while the tension-relieving apparatus is in operation. It is an object of the present invention to provide a limiting device which limits the length of shoulder belt that can be unwound from the retractor when the tension-relieving apparatus is in operation.

An example of a prior art tension-relieving apparatus is disclosed in U.S. patent application Ser. No. 510,814 entitled "Safety Belt Tension-Relieving Apparatus" filed Sept. 30, 1974 in the name of F. C. Booth.

SUMMARY OF THE INVENTION

The improvement of the present invention is adapted for use in a vehicle safety belt system which is adapted to restrain an occupant in a vehicle seat. The safety belt system includes a shoulder belt, a retractor having a rewind mechanism biased to rewind the shoulder belt on a reel shaft of the retractor, and a tension-relieving apparatus for relieving tension on the shoulder belt produced by the rewind mechanism of the retractor. The shoulder belt tension-relieving apparatus includes: a tension-relieving locking member, a tension-relieving wheel, and an actuating means for the locking member. The locking member is disposed on the retractor and has a locking position and an unlocking position. The locking member in its locking position prevents the rewind mechansim from rewinding the shoulder belt into the retractor. The tension-relieving wheel is mounted on the reel shaft of the retractor for engagement by the locking member. The actuating means actuates the locking member to its locking position and thereby relieves tension on the shoulder belt produced by the rewind mechanism of the retractor.

The improvement of the present invention includes a cam, and a stop means. The cam is mounted adjacent to the tension-relieving wheel for rotation therewith. The stop means is mounted on the retractor to limit rotation of the cam and the reel shaft in a direction corresponding to withdrawal of the safety belt from the retractor. As a result, the stop means limits the amount of shoulder belt which can be unwound from the retractor when the tension-relieving apparatus is in operation.

DETAILED DESCRIPTION

Figure 1:
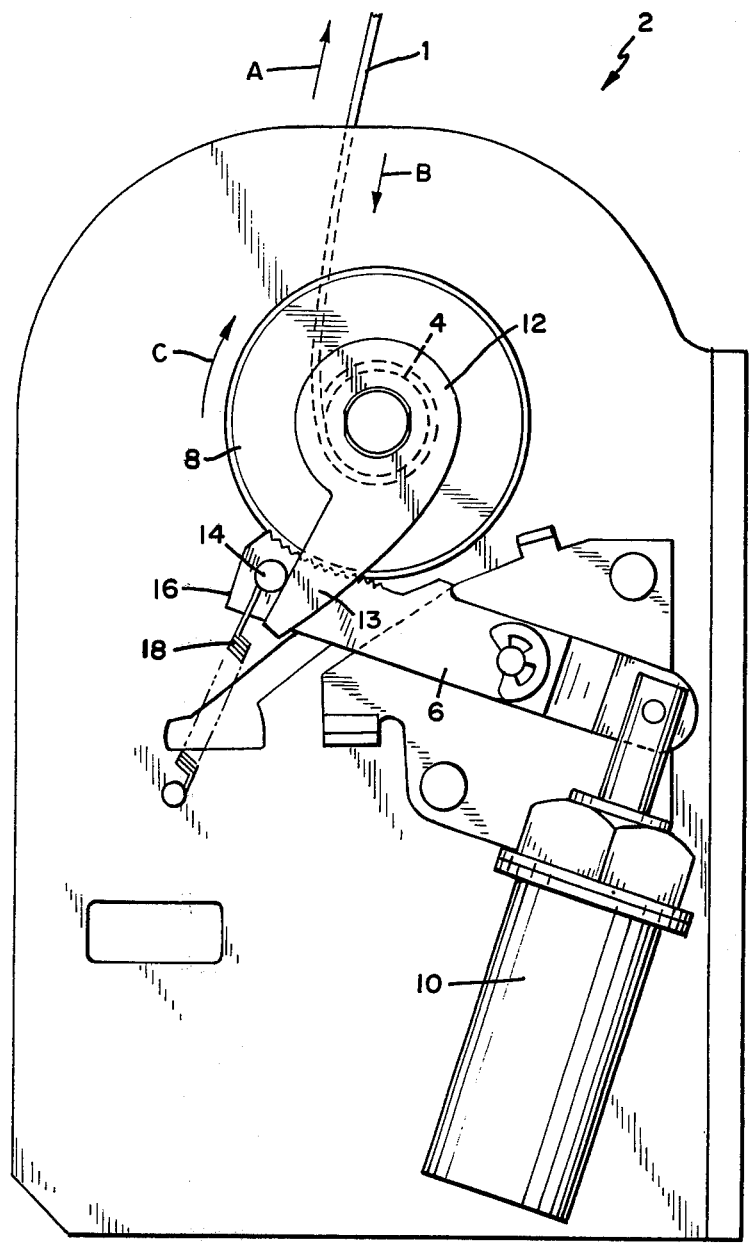
FIG. 1 is a side elevational view of a first embodiment of the present invention.

The improvement of the present invention is adapted for use in a vehicle safety belt system which is adapted to restrain an occupant in a vehicle seat. The safety belt system includes a shoulder belt 1, a retractor (referred to generally by the numeral 2) having a rewind mechanism biased to rewind the shoulder belt on a reel shaft 4 of the retractor 2, and a tension-relieving apparatus for relieving tension on the shoulder belt produced by the rewind mechanism of the retractor 2.

The shoulder belt tension-relieving apparatus includes: a tension-relieving locking member 6, a tension-relieving wheel 8, and an actuating means 10 (such as a solenoid) for the locking member 6. The locking member 6 is pivotably mounted on the retractor 2 and has a locking piosition and an unlocking position. The locking member 6 in its locking position engages the tension-relieving wheel 8 and thereby prevents the rewind mechanism from rewinding the shoulder belt 1 into the retractor 2. The tension-relieving wheel 8 is mounted on the reel shaft 4 of the retractor 2 for engagement by the locking member 6. The actuating means 10 actuates the locking member 6 to its locking position and thereby relieves tension on the shoulder belt produced by the rewind mechanism of the retractor 2.

The improvement of the present invention includes a cam 12 and a stop means 14. The cam 12 is mounted adjacent to the tension-relieving wheel 8 for rotation therewith. The stop means 14 is mounted on the locking member 6 to limit rotation of the cam 12 and the reel shaft 4 in a direction (indicated by arrow C) corresponding to withdrawal of the shoulder belt 1 from the retractor 2. As a result, the stop means 14 limits the amount of shoulder belt 1 which can be unwound from the retractor 2 when the tension-relieving apparatus is in operation.

The cam 12 may be mounted on the reel shaft 4 of the retractor 2, as shown in FIG. 1. In the alternative, the cam 12 may be mounted on the wheel 8. The stop means 14 may be a peg mounted on the tension-relieving locking member 6.

In a first embodiment shown in FIG. 1, the tension-relieving wheel 8 is made of a resilient material, such as rubber or nylon, and the tension-relieving locking member 6 has a serrated engaging surface for engaging the resilient wheel 8.

Figure 2:
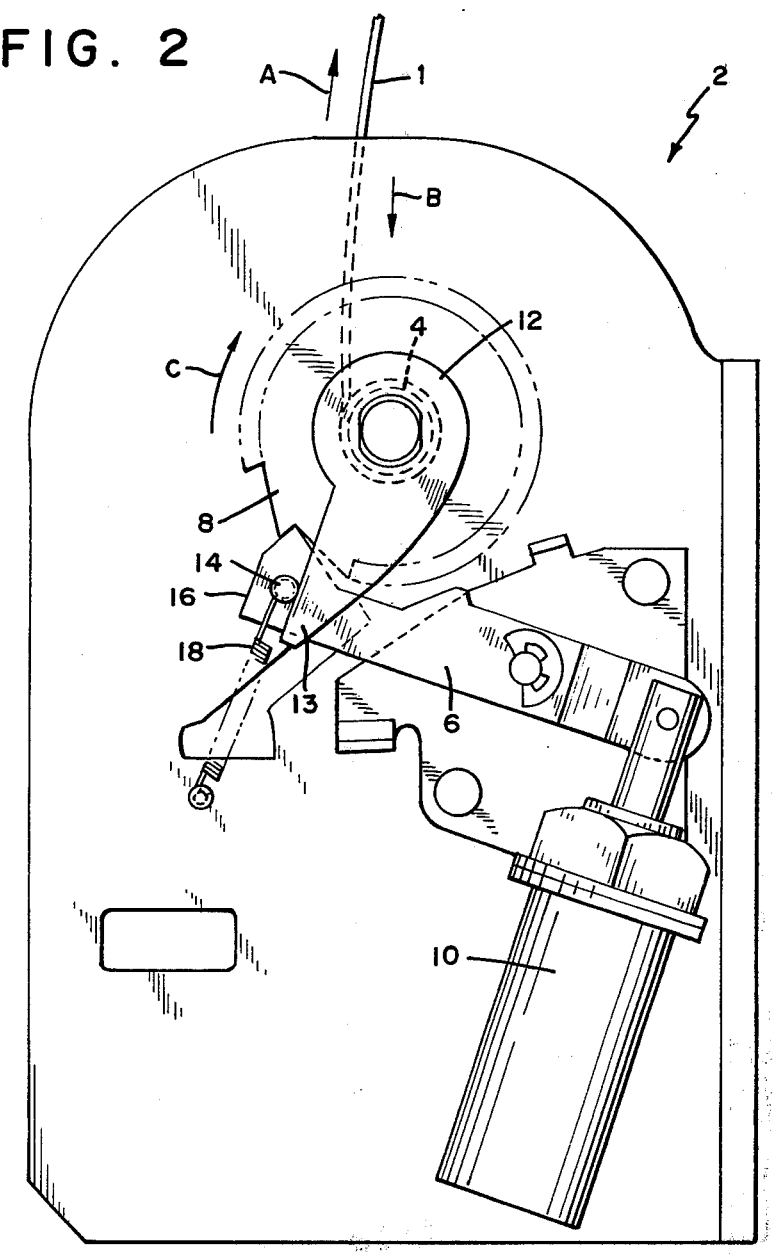
FIG. 2 is a side elevational view of a second embodiment of the present invention.

In a second embodiment shown in FIG. 2, the tension-relieving wheel 8 is a ratchet wheel having ratchet teeth, and the locking member 6 is a locking pawl for engaging a ratchet tooth of the ratchet wheel.

Figure 3:
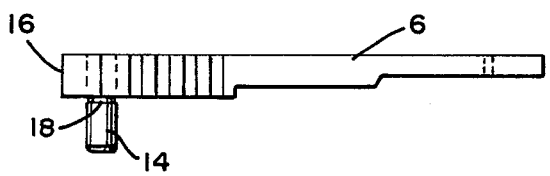
FIG. 3 is a top plan view of a portion of FIG. 1, showing the locking member.
Figure 4:
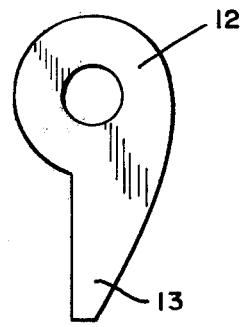
FIG. 4 is a side elevational view of a portion of FIG. 1, showing a clutch member.

Referring to FIG. 3, the stop means 14 may be an appendage such as a dowel or peg which extends from an exterior side of a locking end 16 of the locking member 6. Referring to FIG. 4, the cam 12 may have an extension 13 for abutting the stop means 14.

In operation, the locking member 6 is moved by the actuating means 10 to its locking position after an occupant in the vehicle has buckled up the shoulder belt 1, as shown in FIGS. 1 and 2. The engagement of the locking member 6 with the tension-relieving wheel 8 prevents the shoulder belt 1 from being withdrawn into the retractor 2 in a direction indicated by arrow B. The tension-relieving locking member 6 in its locking position thereby relieves tension which would otherwise be exerted on the shoulder belt 1 by a rewind mechanism of the retractor. In other words, the locking member 6 counteracts the bias of the rewind mechanism. Such counteraction of the rewind mechanism can have the undesirable side effect of allowing the shoulder belt 1 to be withdrawn from the retractor 2 in a direction indicated by arrow A, since the rewind mechanism has been overcome. Such withdrawal of the shoulder belt 1 from the retractor 2 causes the reel 4 to rotate in the clockwise direction indicated by arrow C. Since the cam 12 rotates with the tension-relieving wheel 8, the cam 12 also rotates in the direction indicated by arrow C when the shoulder belt 1 is withdrawn.

When the cam 12 begins to rotate, the extension 13 of the cam 12 abuts against the stop means 14. Such abutment of the cam 12 limits the cam 12 from turning and also prevents the reel 4 from turning in the direction of arrow C which in turn prevents withdrawal of the shoulder belt 1 from the retractor 2. The cam 12 and stop means 14 limit the amount of shouler belt 1 which can be withdrawn from the retractor 2 to not more than one rotation of the reel 4. When the locking member 6 is biased in its unlocking position, such as by spring 18, that is, away from engagement with the tension-relieving wheel 8, the stop means 14 is moved far enough away from the extension 13 of cam 12 so that the cam 12 no longer abuts the stop means 14. When the cam 12 no longer abuts the stop means 14, the shoulder belt 1 can be freely withdrawn from the retractor 2 without limitation from the cam 12 and stop means 14.

We claim:

1. In a vehicle safety belt system adapted to restrain an occupant in a vehicle seat, the safety belt system including a shoulder belt; a retractor having a rewind mechanism biased to rewind the shoulder belt on a reel shaft of the retractor; and a tension-relieving apparatus for relieving tension on the shoulder belt produced by the rewind mechanism of the retractor; said shoulder belt tension-relieving apparatus including: a tension-relieving locking member disposed on said retractor, said locking member having a locking position and an unlocking position, said locking member in its locking position preventing operation of the rewind mechanism, thereby preventing further rewinding of the shoulder belt into the retractor; a tension-relieving wheel mounted on the reel shaft of the retractor for engagement by said locking member; an actuating means for actuating said locking member to its locking position and thereby relieving the tension on said shoulder belt produced by the rewind mechanism of the retractor; the improvement comprising:

a cam mounted adjacent to said tension-relieving wheel for rotation therewith; and stop means mounted on said locking member to limit rotation of said cam and said reel shaft in the unwinding direction corresponding to withdrawal of said safety belt from said retractor.

2. The shoulder belt tension-relieving apparatus of claim 1 wherein said cam is mounted on said reel shaft of said retractor.

3. The shoulder belt tension-relieving apparatus of claim 1 wherein: said tension-relieving wheel is made of a resilient material; and said tension-relieving locking member has an engaging surface for engaging said wheel.

4. The shoulder belt tension-relieving apparatus of claim 1 wherein: said tension-relieving wheel is a ratchet wheel having ratchet teeth; and said tension-relieving locking member is a locking pawl for engaging said ratchet wheel.

5. The shoulder belt tension-relieving apparatus of claim 1 wherein: said stop means is an appendage which extends from one side of a locking end of said locking member; and said cam has an extension for abutting said stop means.

6. In a vehicle safety belt system adapted to restrain an occupant in a vehicle seat, the safety belt system including a shoulder belt; a retractor having a rewind mechanism biased to rewind the shoulder belt on a reel shaft of the retractor; and a tension-relieving apparatus for relieving tension on the shoulder belt produced by the rewind mechanism of the retractor; said shoulder belt tension-relieving apparatus including: a tension-relieving locking member disposed on said retractor, said locking member having a locking end, a locking position and an unlocking position, said locking member in its locking position preventing operation of the rewind mechanism, thereby preventing further rewinding of the shoulder belt into the retractor; a tension-relieving wheel mounted on the reel shaft of the retractor for engagement by said locking member; an actuating means for actuating said locking member to its locking position and thereby relieving the tension on said shoulder belt produced by the rewind mechanism of the retractor; the improvement comprising:

a cam mounted on said reel shaft of said retractor adjacent to said tension-relieving wheel for rotation therewith; and an appendage extending from an exterior side of said locking end of said locking member to limit rotation of said cam and said reel shaft in the unwinding direction corresponding to withdrawal of said safety belt from said retractor, said cam having an extension for abutting said appendage.

* * * * *